(12) United States Patent
Sirilutporn et al.

(10) Patent No.: US 7,409,756 B2
(45) Date of Patent: Aug. 12, 2008

(54) METHOD OF LOCATING AND REMOVING A FASTENER FROM A WORKPIECE

(75) Inventors: Andre Sirilutporn, Milpitas, CA (US); Jr-Yi Shen, Sunnyvale, CA (US); Kunihiro Shida, San Jose, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 660 days.

(21) Appl. No.: 11/058,516

(22) Filed: Feb. 15, 2005

(65) Prior Publication Data

US 2006/0179633 A1   Aug. 17, 2006

(51) Int. Cl.
  *B23P 11/00* (2006.01)
  *B23P 19/00* (2006.01)
(52) U.S. Cl. ............. 29/407.01; 29/407.04; 29/407.09; 29/407.1; 29/426.1; 29/240
(58) Field of Classification Search .............. 29/630.02, 29/603.03, 402.03, 407.01, 407.04, 407.09, 29/407.1, 426.1, 426.5, 709, 764, 240; 901/41, 901/46, 47; 173/1; 470/3, 45, 49
See application file for complete search history.

(56) References Cited

U.S. PATENT DOCUMENTS

| | | | |
|---|---|---|---|
| 2,930,976 A | 3/1960 | Hirdler | |
| 3,977,236 A * | 8/1976 | Raatz et al. | 73/614 |
| 4,048,687 A * | 9/1977 | Kato et al. | 470/45 |
| 4,982,333 A | 1/1991 | Ackerman et al. | |
| 5,531,009 A * | 7/1996 | Givler | 29/243.53 |
| 5,539,292 A | 7/1996 | Vranish | |
| 5,807,048 A * | 9/1998 | d'Agraives et al. | 411/2 |
| 6,041,488 A | 3/2000 | Wang | |
| 6,481,093 B1 | 11/2002 | Ruden et al. | |
| 6,763,573 B2 * | 7/2004 | Walt et al. | 29/707 |
| 2002/0040891 A1 | 4/2002 | Hong et al. | |

FOREIGN PATENT DOCUMENTS

| | | |
|---|---|---|
| DE | 3927889 | 2/1991 |
| JP | 55144939 A * | 11/1980 |
| JP | 59124531 A * | 7/1984 |
| JP | 02076646 A * | 3/1990 |
| JP | 2001280936 | 10/2001 |
| JP | 2002277280 | 9/2002 |

* cited by examiner

*Primary Examiner*—Jermie E Cozart
(74) *Attorney, Agent, or Firm*—Bracewell & Giuliani LLP

(57) ABSTRACT

A system for locating and determining the orientation of fasteners in hard disk drive spindle assemblies utilizes a sensor system that facilitates an automated rework process for the spindle assemblies. The screw locating system identifies the locations of the screws in a spindle and generates a signal for a screw driver system to align tool bits with the screws. The sensor is highly advantageous when reworking spindle motors with opaque labels that cover and/or block the fasteners. The present invention overcomes the drawbacks of prior art techniques by using a screw locating system that is based on a selected capacitance probe without requiring the use of timing features.

16 Claims, 4 Drawing Sheets

METHOD OF LOCATING AND REMOVING A FASTENER FROM A WORKPIECE

BACKGROUND OF THE INVENTION

1. Technical Field

The present invention relates in general to reworking defective workpieces and, in particular, to an improved system, method, and apparatus for detecting fasteners, such as screws, and their angular orientation during automated rework of defective disk packs.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The motor used to rotate the disk is typically a brushless DC motor. The disk is mounted and clamped to a hub of the motor. The hub provides a disk mounting surface and a means to attach an additional part or parts to clamp the disk to the hub. In most typical motor configurations of HDDs, the rotating part of the motor (the rotor) is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path. For smooth and proper operation of the motor, the rotor magnet magnetic pole pattern should not be substantially altered after it is magnetically charged during the motor's manufacturing process.

Improving yield and saving cost are high priorities in a manufacturing area. Higher yield implies less waste on parts and higher profitability. One way to improve the yield and save cost is to rework rejected product assemblies. By replacing limited components in the rework process, the re-worked assembly may have a chance to meet the product quality requirement, thus avoiding scrapping the whole assembly and reducing the production cost. The concept of rework is well known and commonly implemented in the competitive hard disk drive (HDD) industry.

Currently, two primary techniques are used to locate the screws when reworking spindle packs: vision systems and optical sensors that identify timing marks on the spindles. Vision systems work only if there is no label on top of the screws or the label is either transparent or translucent. Optical sensors used in conjunction with timing marks require a hole or a notch on the spindle to identify the screw location. However, the timing feature increases the part cost and it may impact the HDD performance. Thus, an improved solution would be desirable.

SUMMARY OF THE INVENTION

One embodiment of a system, method, and apparatus for a fastener locating system for workpieces, such as disk drives, is disclosed. A sensor system utilized by the invention is particularly well suited for enabling an automated rework process on spindle assemblies. The fastener or screw locating system is designed to identify the locations of the screws in a spindle system and generate a signal for the screw driver system to align the tool bits with the screws. This type of sensor is very helpful when reworking spindle assembly rejects. In particular, the sensor is highly advantageous when reworking a spindle motor with an opaque label that covers and/or blocks its fasteners.

The present invention eliminates the drawbacks of prior art techniques. Using a screw locating system based on (in one embodiment) a selected capacitance probe, HDD manufacturers may use translucent or opaque labels that hide the fasteners from view on the spindle motor and still have the capability to orient the screw drivers to the screw locations. Moreover, there is no need for timing features, which causes a certain level of asymmetry to the disk pack.

The screw locating system is designed to locate the screws for the automated rework tool of HDD spindles. In one embodiment, the system is integrated with an automated screw driver and shares an AC power source at 115 V, 60 Hz. A fixture is used to hold the capacitance probe. A sensor probe rotates with a step motor and the target object remains stationary. The output signal may comprise DC voltage ranging from 0 to 24 V. Angular orientation of the screw is calculated by customized post-processing software. The software processes the measurement data and decides the orientation of the screws. Based on the calculation result, a circuit generates a DC output from 0 to 24 V, which is linearly mapped with the angular orientation from 0 to 360 degrees. The output range may be customized by changing the software and electronic circuits to render a more flexible and user friendly device.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
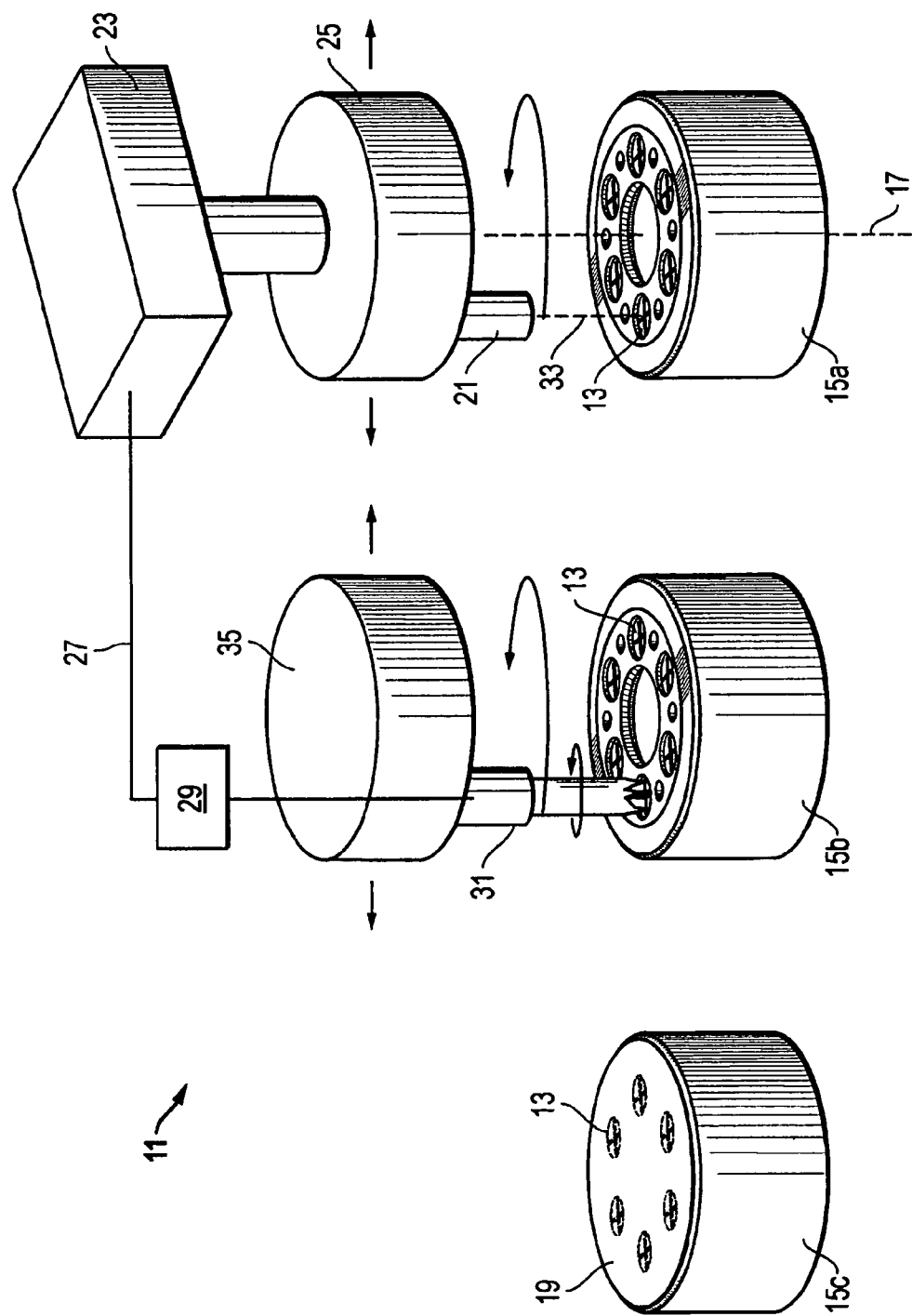
FIG. 1 is a schematic diagram of one embodiment of a fastener locating and removal system and workpieces constructed in accordance with the present invention.
Figure 2:
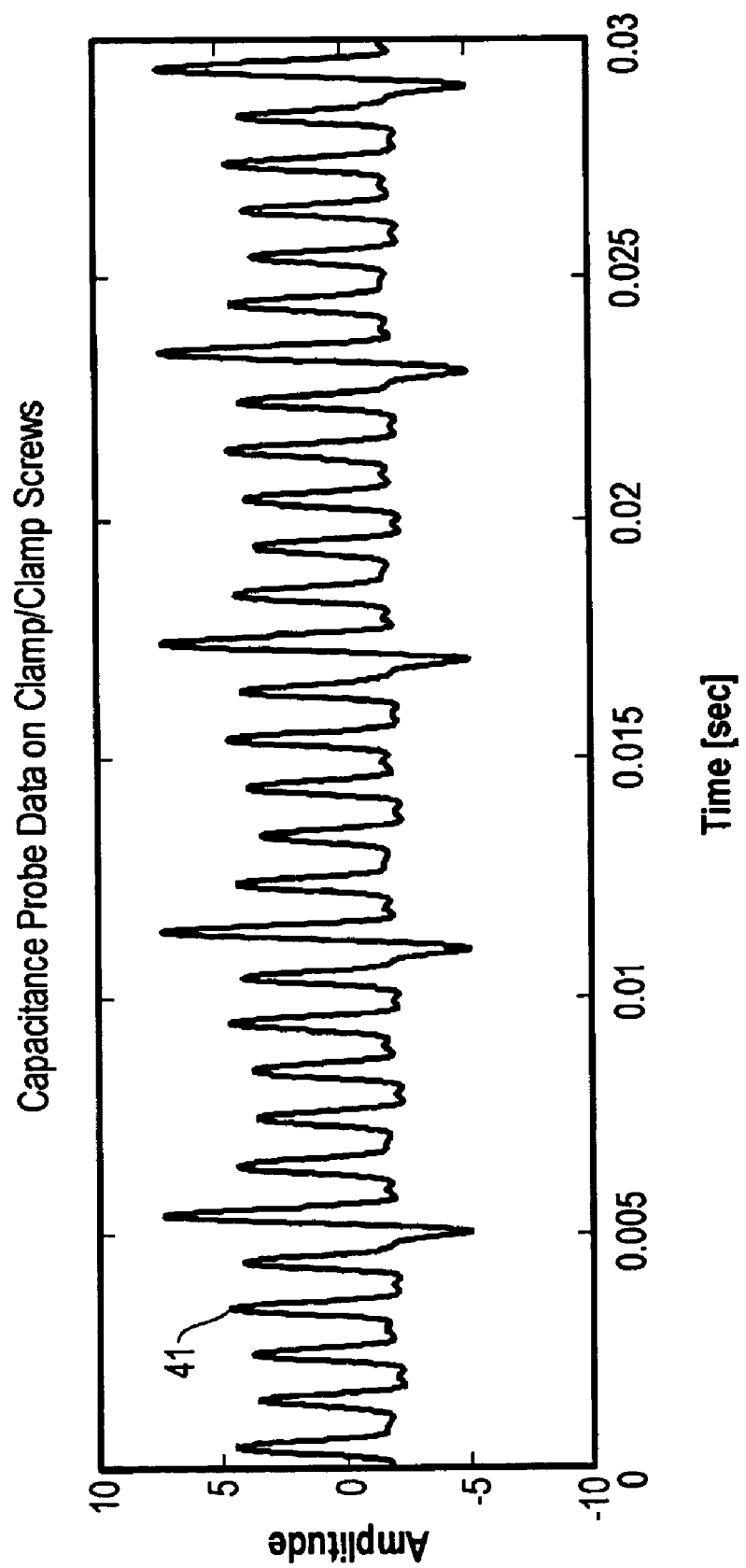
FIG. 2 is a plot of capacitance probe data for the system of FIG. 1.
Figure 3:
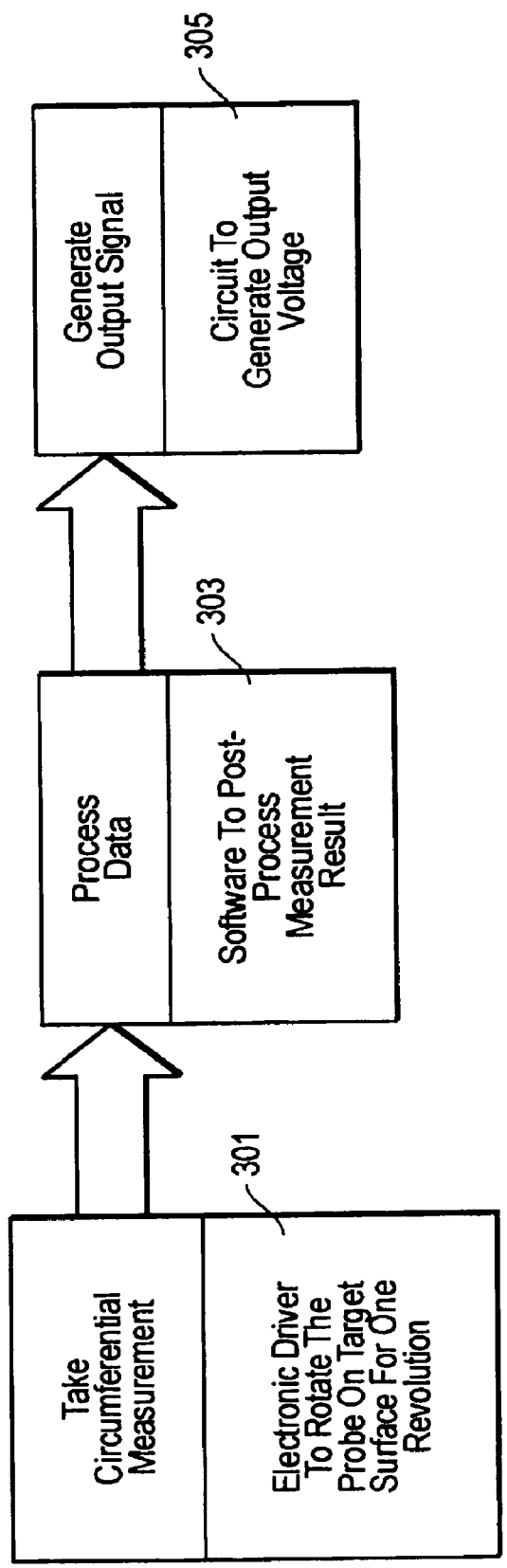
FIG. 3 is a high level flow diagram of a method constructed in accordance with the present invention.

Referring to FIGS. 1-3, one embodiment of a system, method, and apparatus for locating and removing fasteners from a workpiece is disclosed. As shown in FIG. 1, the system 11 of the present invention is well suited for applications such as locating and removing screws 13 from disk drive spindles 15 (e.g., spindles 15a, 15b, 15c) for enabling an automated rework process on spindle assemblies. Each spindle 15 has a plurality of screws (six shown) mounted thereto. In one version, the screws 13 are axially symmetric about a central axis 17 of the spindle 15. Spindle 15c is shown with an opaque label 19 affixed thereto that completely obstructs a view of the screws 13 (shown in phantom).

The system 11 comprises a sensor, such as a capacitance probe 21, for detecting the screws 13 on the spindles 15. The capacitance probe 21 is able to precisely locate the screws 13 regardless of whether they are visible or not (e.g., behind the opaque label 19 on spindle 15c). A movable fixture 23, such as a robotic fixture, is used for positioning the capacitance probe 21 adjacent the spindle 15. The system 11 also uses a device, such as a step motor 25, for moving (e.g., rotating) the capacitance probe 21 relative to the spindle 15. Alternatively, the spindle 15 may be moved relative to the capacitance probe 21. In one embodiment, the capacitance probe has sub-micron resolution and the step motor drives the capacitance probe to rotate over the disk drive spindle at increments of approximately 1.8 degrees.

The capacitance probe 21 scans the spindle 15 for the screws 13 and detects the locations (e.g., the angular and radial locations relative to axis 17) of each screw 13 relative to the spindle 15. In one embodiment, the rotational axis about which the capacitance probe 21 rotates is co-axial with the axis 17 of the spindle 15, such that the radial location is aligned and fixed relative to the screws 13. The capacitance probe 21 also provides signals 27 to a controller 29 that precisely identify the locations of the screws 13. In the case of axially symmetric screws, a space or distance separation between the screws 13 is averaged to improve an accuracy of the automated screw driver. Typically, the screws 13 are located and recessed in counter bores in the spindle 15. The capacitance probe 21 identifies a change in distance 33 (see dashed line) from a surface of the spindle 15 to the screws 13 by showing a voltage (e.g., signal 27) proportional to the distance from the target. Alternatively, if the screws 13 are formed from a different material than the spindle 15, the capacitance probe 21 can identify a change in material from the spindle 15 to the screws 13.

An automated fastener removal device, such as a screw driver 31, is also operated by the system 11 via a movable fixture 35, such as a robotic fixture. Screw driver 31 is responsive to the signals 27 (via controller 29) from the capacitance probe 21 for moving adjacent the spindle 15 to engage and remove the screws 13 from the spindle 15. Thus, the controller 29 controls the capacitance probe 21, the fixture 23, the step motor 25, the automated screw driver 31 and, optionally, the movement of the spindles 15.

FIG. 2 shows a demonstrative measurement result of the feasibility of the system 11 illustrated in FIG. 1. However, instead of rotating the probe 21, a measurement is taken while rotating the spindle 15 at 10,000 rpm (1661 Hz). Approximately five revolutions of the spindle 15 are represented in FIG. 2, with six spikes 41 (i.e., screws) per revolution. In the embodiment tested, the screws 13 were recessed from the surface of the spindle 15 and the probe 21 shows a higher voltage when the target surface is far from the probe 21. As a result, each spike 41 in the time domain plot corresponds to a screw 13. For a complete screw locating system, the selected capacitance probe may be provided with sub-micron resolution and the step motor drives the probe to rotate over the spindle surface with an increment of 1.8 degrees at low RPM. The capacitance probe signal is analyzed in time domain to decide the angular orientation of the screws. In addition, if the screw locations are axially symmetric, improved accuracy is delivered by averaging the space separation between spikes.

One embodiment of an operation flow chart is presented in FIG. 3. As shown in step 301, an electronic driver is used to rotate the probe over the desired circular path to take the measurements. System software (step 303) processes the time domain signal shown in FIG. 2. After the angular orientation of the screw is determined, a circuit (step 305) is used to generate a DC voltage output.

Figure 4:
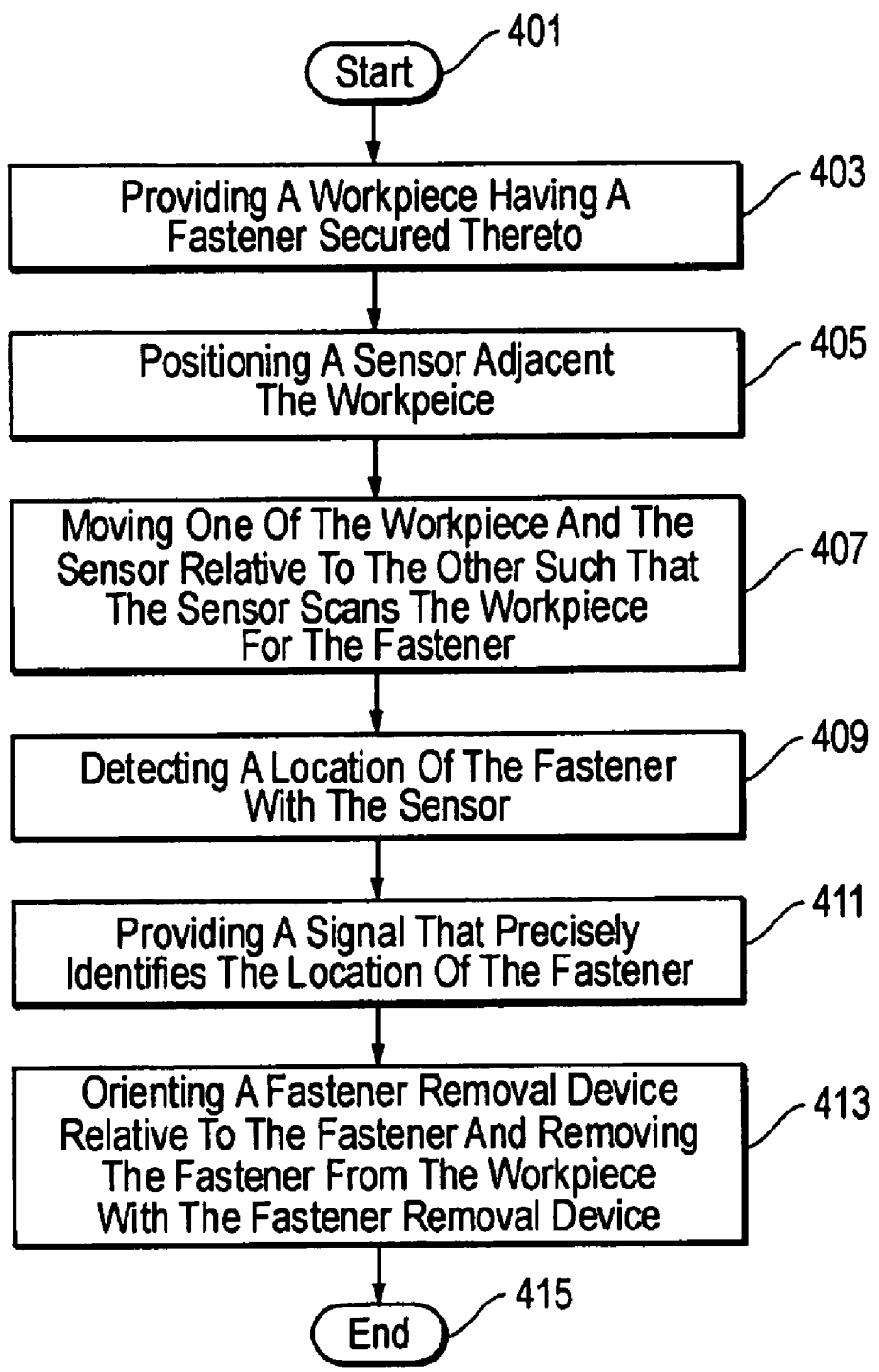
FIG. 4 is an alternate embodiment of a high level flow diagram of a method constructed in accordance with the present invention.

Referring now to FIG. 4, the present invention also comprises a method of locating and removing a fastener from a workpiece. The method starts as indicated at step 401, and comprises providing a workpiece having a fastener secured thereto (step 403); positioning a sensor adjacent the workpiece (step 405); moving one of the workpiece and the sensor relative to the other such that the sensor scans the workpiece for the fastener (step 407); detecting a location of the fastener with the sensor (step 409); providing a signal that precisely identifies the location of the fastener (step 411); and then orienting a fastener removal device relative to the fastener and removing the fastener from the workpiece with the fastener removal device (step 413). The method ends as indicated at step 415.

The present invention has several advantages, including the ability to quickly and precisely locate fasteners that are shielded from view. This sensor system enables automated rework for various types of workpieces. The system identifies the locations of the fasteners and generates signals for a screw driver to align a tool bit with the fasteners. The sensor is highly advantageous when reworking a workpiece with an opaque label that covers and/or blocks its fasteners from view.

While the invention has been shown or described in only some of its forms, it should be apparent to those skilled in the art that it is not so limited, but is susceptible to various changes without departing from the scope of the invention.

What is claimed is:

1. A method of locating and removing a fastener from a workpiece, the method comprising:
   (a) providing a workpiece having a fastener secured thereto;
   (b) positioning a sensor adjacent the workpiece;
   (c) moving one of the workpiece and the sensor relative to the other such that the sensor scans the workpiece for the fastener;
   (d) detecting a location of the fastener with the sensor by identifying a change in material on the workpiece;
   (e) providing a signal that precisely identifies the location of the fastener; and then
   (f) orienting a fastener removal device relative to the fastener and removing the fastener from the workpiece with the fastener removal device.

2. A method as defined in claim 1, wherein step (a) further comprises obscuring the fastener from visual detection.

3. A method as defined in claim 1, wherein step (c) comprises rotating the sensor relative to the workpiece with a step motor.

4. A method as defined in claim 3, wherein the sensor has sub-micron resolution and the step motor drives the sensor to rotate over the workpiece at increments of 1.8 degrees.

5. A method as defined in claim 1, wherein the fastener comprises a plurality of fasteners that are axially symmetric about the workpiece, and step (d) further comprises averaging a space separation between the fasteners to improve an accuracy of the fastener removal device.

6. A method as defined in claim 1, wherein step (d) comprises identifying a change in distance from the sensor.

7. A method as defined in claim 1, wherein step (d) comprises utilizing a capacitance probe, and wherein step (e) comprises outputting the signal as a DC voltage.

8. A method as defined in claim 1, wherein the workpiece is a disk drive spindle, the fastener is a screw, and the fastener removal device is an automated screw driver.

9. A method of locating and removing screws from a disk drive spindle for enabling an automated rework process for disk drive spindles, the method comprising:
   (a) providing a disk drive spindle having a plurality of screws secured thereto in a symmetrical configuration;
   (b) positioning a sensor adjacent the disk drive spindle;
   (c) moving one of the disk drive spindle and the sensor relative to the other such that the sensor scans the disk drive spindle for the screws;
   (d) detecting a location of each of the screws with the sensor;
   (e) providing signals that precisely identify the locations of the screws; and then
   (f) orienting an automated screw driver relative to the screws and removing the screws from the disk drive spindle with the automated screw driver.

10. A method as defined in claim 9, wherein step (a) further comprises obscuring the screws from visual detection with an opaque label located on the disk drive spindle.

11. A method as defined in claim 9, wherein step (c) comprises rotating the sensor relative to the disk drive spindle with a step motor.

12. A method as defined in claim 11, wherein the sensor has sub-micron resolution and the step motor drives the sensor to rotate over the disk drive spindle at increments of 1.8 degrees.

13. A method as defined in claim 9, wherein step (d) further comprises averaging a space separation between screws to improve accuracy.

14. A method as defined in claim 9, wherein the screws are located and recessed in counter bores in the disk drive spindle, and wherein step (d) comprises identifying a change in distance from the sensor.

15. A method as defined in claim 9, wherein the screws are formed from a different material than the disk drive spindle, and wherein step (d) comprises identifying a change in material on the disk drive spindle.

16. A method as defined in claim 9, wherein step (d) comprises utilizing a capacitance probe that shows voltage proportional to a distance from a target, and wherein step (e) comprises outputting the signals as DC voltage.

* * * * *

UNITED STATES PATENT AND TRADEMARK OFFICE
CERTIFICATE OF CORRECTION

PATENT NO. : 7,409,756 B2  Page 1 of 1
APPLICATION NO. : 11/058516
DATED : August 12, 2008
INVENTOR(S) : Andre Sirilutporn Chan, Yr. Yi Shen and Kunihiro Shida It is certified that error appears in the above-identified patent and that said Letters Patent is hereby corrected as shown below:

On the Title Page Item (75) Inventors: add last name of first inventor "Chan"

Signed and Sealed this

Second Day of June, 2009

JOHN DOLL
*Acting Director of the United States Patent and Trademark Office*